US006481156B1

(12) United States Patent
Richmond (10) Patent No.: US 6,481,156 B1
(45) Date of Patent: Nov. 19, 2002

(54) KENNEL DOOR APPARATUS

(76) Inventor: Bob Richmond, 1888 Colora Rd., Colora, MD (US) 21917

( * ) Notice: Subject to any disclaimer, the term of this patent is extended or adjusted under 35 U.S.C. 154(b) by 0 days.

(21) Appl. No.: 09/628,663

(22) Filed: Jul. 28, 2000

Related U.S. Application Data

(63) Continuation-in-part of application No. 09/225,444, filed on Jan. 6, 1999.

(51) Int. Cl.$^7$ .............................................. E05B 53/00
(52) U.S. Cl. ............................................. 49/24; 49/360
(58) Field of Search ........................... 49/24, 169, 170, 49/324, 360; 119/19

(56) References Cited

U.S. PATENT DOCUMENTS

| 776,559 A | * | 12/1904 | Smith ............................. 49/24 |
| 3,718,120 A | * | 2/1973 | Schwarz et al. .............. 119/19 |

* cited by examiner

Primary Examiner—Jerry Redman
(74) Attorney, Agent, or Firm—Krieg DeVault Lundy, LLP

(57) ABSTRACT

A kennel door apparatus for selectively "opening" and "closing" a kennel door, the kennel door is sized to cover an opening located in a kennel wall between a kennel pen and a common kennel area for selective access thereto. A door opening attachment may be used to cover the opening in the kennel wall. The kennel door apparatus is adapted for vertical sliding door actuation. First and second opposing, channel guides are secured to opposing sides of a protective panel. A sliding door is slidably received between the wall confronting side and the panel side of the opposing channel guides. The opposing channel guides are vertically aligned and secured about an opening in the kennel wall. A cable is used to pull the sliding door between "open" and "closed" positions. A weather strip is secured to the sliding door between the opposing channel guides. The weather strip is positioned beneath the protective panel when the sliding door is in the "closed" position. The cable may be remotely actuated to selectively move more than one kennel door between "open" and "closed" positions by manual, electrical, hydraulic, or pneumatic operation.

20 Claims, 7 Drawing Sheets

KENNEL DOOR APPARATUS

This application is a continuation in part application of U.S. Ser. No. 09/225,444 filed Jan. 6, 1999. This continuation in part application is directed to an improved, vertically actuated kennel door apparatus, designed to fit a new or existing opening in a kennel wall. More specifically, this apparatus provides a slidable kennel door, which may be remotely controlled for selective access to and from a plurality of kennel pens to a common kennel run area. This kennel door apparatus is adapted for vertical sliding door actuation.

Most kennel walls are made of concrete or cement block construction, with openings extending through the kennel wall from each of the individual kennel pens to a common kennel run. The openings must be selectively actuated to provide safe and efficient animal control, and to selectively restrict access to the kennel run during cleaning, maintenance, etc.

BACKGROUND OF THE INVENTION

The following patents are representative of the art in animal access doors:

U.S. Pat. No. 4,322,913 issuing to Robert Himmer on Apr. 6, 1982, discloses an automatic door for pets which slides in opposing tracts, or is hinged as shown in FIG. 5. The door may have a window inserted in the door, and the door is raised and lowered with an electric motor when a pet steps on a pressure pad.

U.S. Pat. No. 4,754,797 issuing to Robert Sronce on Jul. 5, 1988, discloses an animal door having a pliant door and a removable sliding door to seal off the pliant door.

U.S. Pat. No. 4,384,376 issuing to June Shrode on May 24, 1983 discloses a shower door assembly, wherein a door is manually moved horizontally by a handle to access shower handles, without opening the shower door.

U.S. Pats. Nos. 4,651,793 and 3,797,554 are representative of other pet door structures utilizing swinging doors.

U.S. Pats. Nos. 1,888,612 and 1,442,553 are representative of doors which are vertically slidable between opposing rails, which do not provide nor make obvious the use of a protective panel to prevent pets from chewing on the door or on the cable when the door is raised.

SUMMARY OF THE INVENTION

The kennel access door disclosed herein, comprises two opposing channel guide members to guide the door between opening and closing positions. The opposing channel guide members are secured to a protective panel extending above the access opening to protect the sliding door and cable from being chewed by the animals. The protective panel further serves to position and align the opposing channel guide members for ease of installation about the kennel opening. A weather strip is secured to the panel door to reduce air flow through the kennel access door when the door is closed. A cable secured to the panel door extends through the end of the protective panel, enabling the user to selectively open and close the sliding door for vertical actuation. One or more pulleys may be used to route the cable to a convenient location to remotely "open" and close the panel door to selected kennel enclosures, providing individual and selective group access to common kennel areas, such as a kennel run. The kennel door apparatus disclosed herein, is preferably mechanically actuated, which enables the operator to actuate the kennel doors even when there is an electrical failure, which may occur during emergency situations, such as a kennel fire, flood, tornado, etc.

Other objects and features of the present invention will become apparent from a consideration of the following description with reference to the accompanying drawings, wherein example embodiments of the invention are selected by way of illustration and not by way of restriction.

DETAILED DESCRIPTION OF THE DRAWINGS

DETAILED DESCRIPTION OF THE PREFERRED EMBODIMENTS

Figures 1, 3:
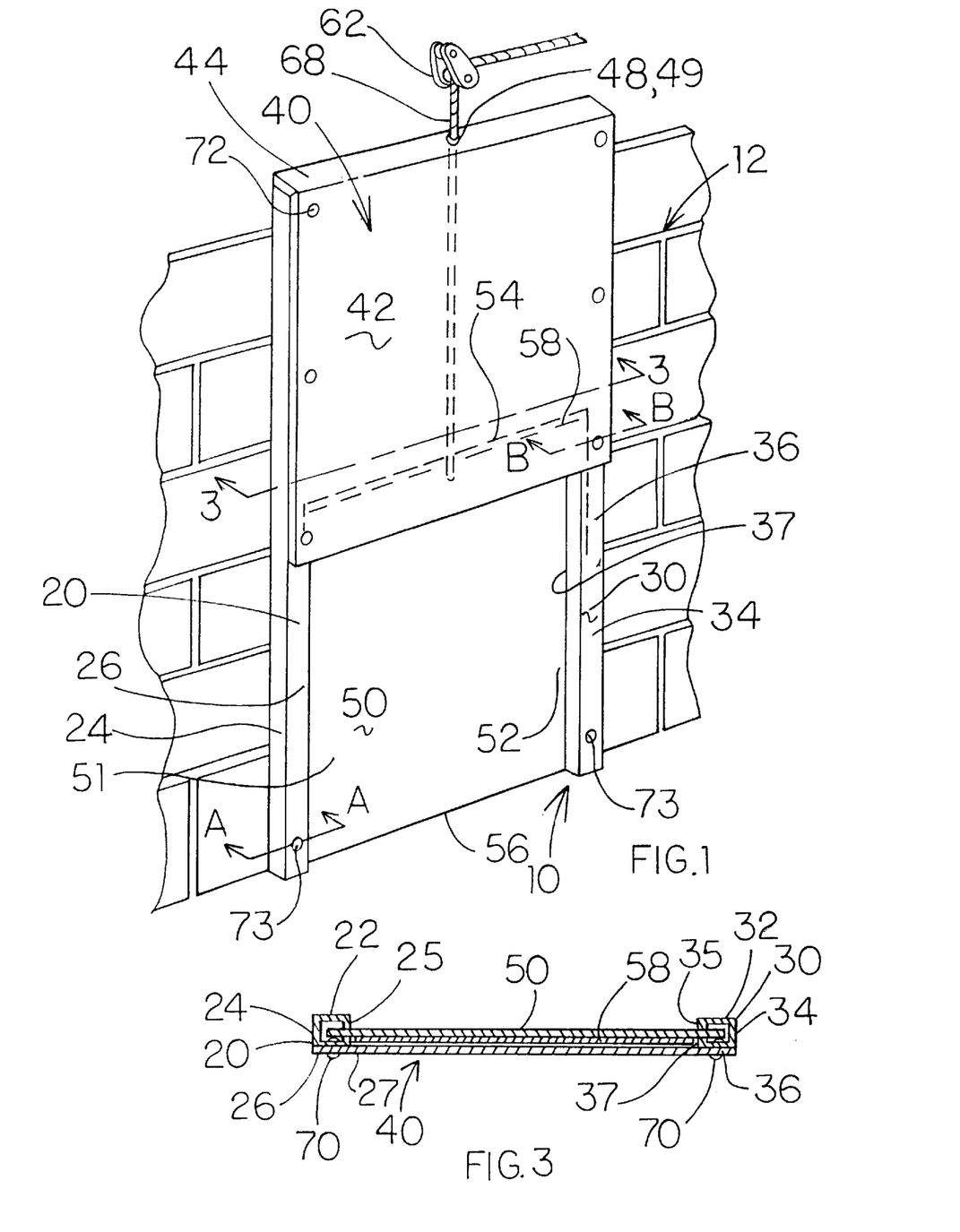
FIG. 1 is a perspective view of the kennel door apparatus vertically installed about a kennel wall opening, with the access door movably positioned in a closed position.
FIG. 3 is a cross sectional view of the kennel door apparatus taken along lines 3—3 in FIG. 1.

As shown in FIG. 1, the kennel door apparatus 10 is mounted to a kennel wall 12 having a new or existing access opening 14 therein. The access opening 14 typically includes a bottom aperture portion 15, opposing side aperture portions 16, 17, and a top aperture portion 18. The access opening 14 may be uniformly sized from kennel pen 19 to kennel pen 19, or the size of the access openings 14 may vary to suit the intended use by different sized animals (not shown).

The kennel door apparatus 10 may be installed on the inside or outside of the kennel pen 19, to suit user preference and the structural limitations of the kennel site.

Figures 2, 4:
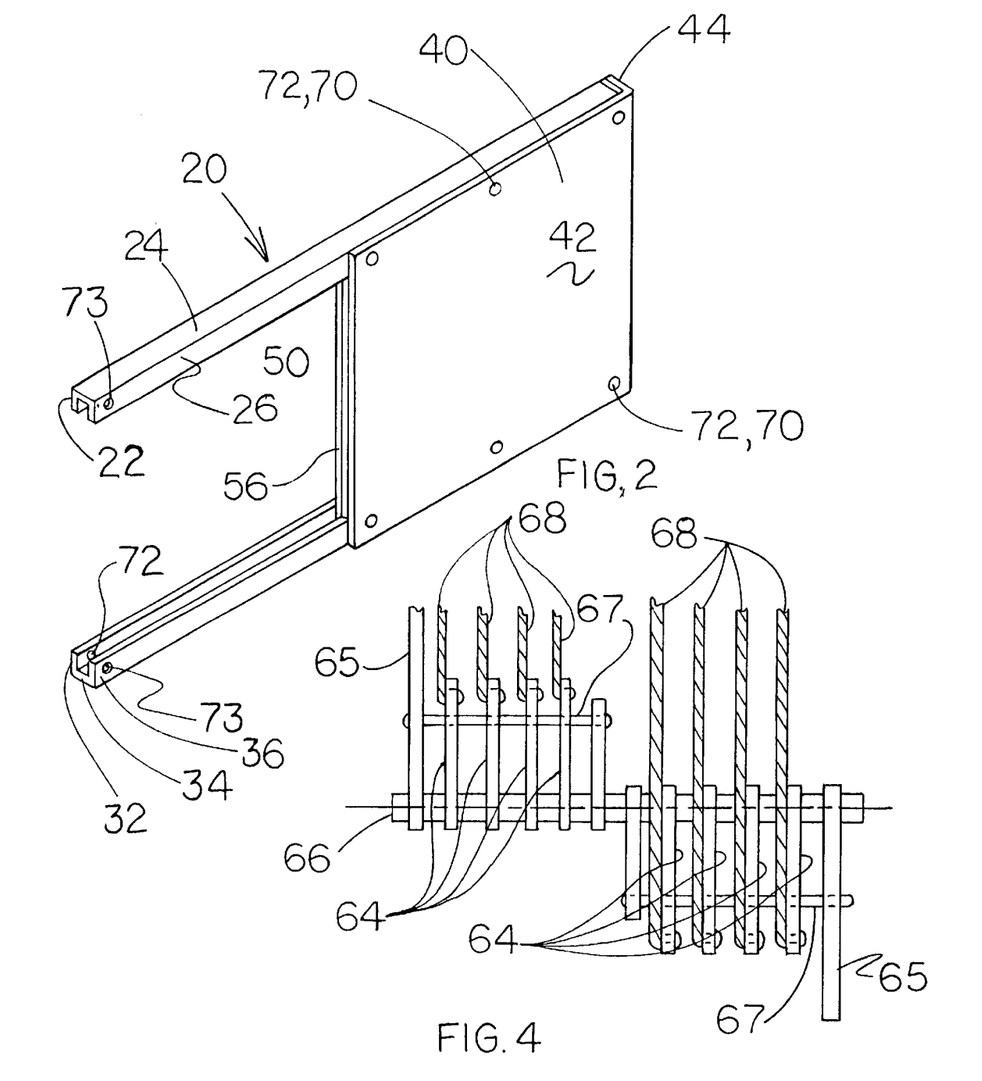
FIG. 2 is a perspective view of the kennel door apparatus prior to installation, shown with the access door in an open position, and with the protective panel secured to the opposing side rails.
FIG. 4 is a top view of cables extending from respective kennel door apparatus, adapted for manual lever actuation.

As shown in FIG. 2, the kennel door apparatus 10, may be pre-assembled to provide proper alignment of the first and second channel guide members 20, 30 in relation to the protective cover 40 prior to installation. This saves valuable time and effort during installation of the kennel door apparatus 10, and ensures that the first and second channel guide members 20, 30 are properly aligned for ease of operation, when "opening" and "closing" the sliding door 50.

Figures 10, 13:
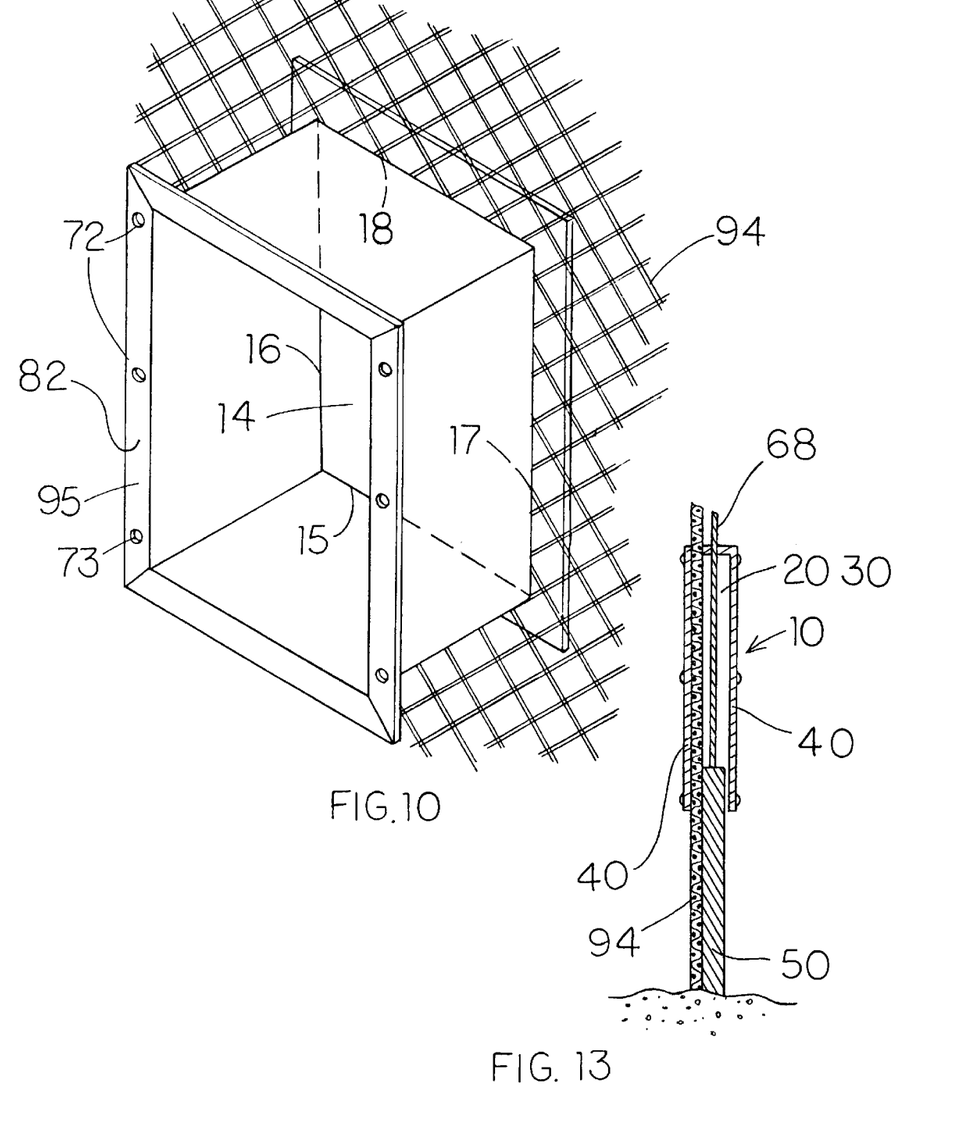
FIG. 10 is a perspective view of a door guard opening attachment used to extend the length of the passage through the enclosure.
FIG. 13 is a fragmentary cross-sectional view of a kennel door apparatus mounted to a wire fence kennel wall taken essentially vertically through the door between the channel guide member and the connection between the door and the guide cable, the apparatus having a protective panel secured to both sides of the apparatus.

Most kennel walls 12 are made of concrete or cement block construction, for durability and ease of maintenance. Some are made of wire fencing material 94, as shown in FIG. 10. The opening 14 in the kennel wall 12 may not be precisely square which makes installation of prior art separate channel guide members time consuming and expensive to install.

The pre-assembled kennel door apparatus 10 of this invention is shown in FIG. 2. The pre-assembled kennel door apparatus 10 may also be used as a guide to mark the kennel wall 12 prior to cutting an access opening 14 in the kennel wall 12.

Figure 5A:
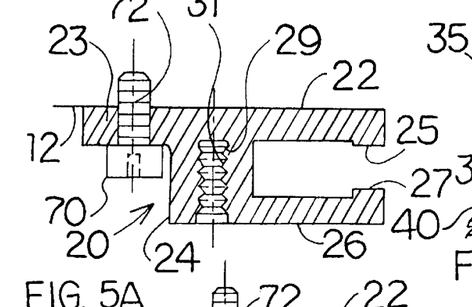
FIG. 5A is a cross sectional view taken along lines A—A in FIG. 1, showing one example channel mounting configuration.
Figures 6A, 6B, 7A, 7B, 9:
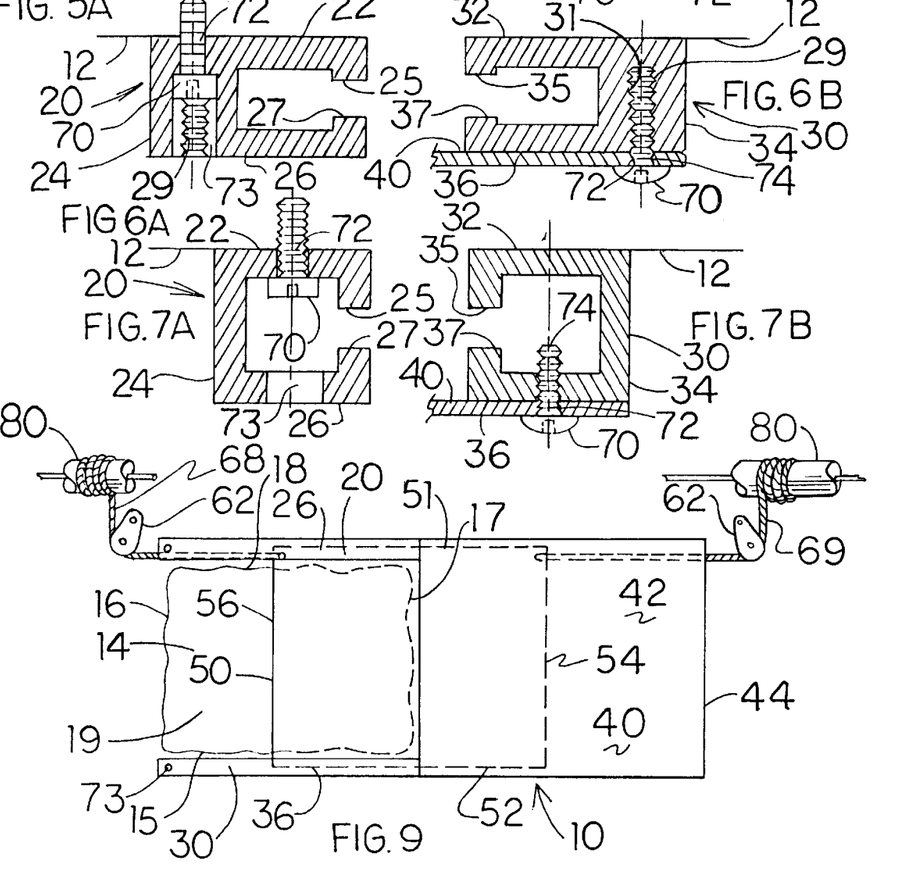
FIG. 6A is a cross sectional view taken along lines A—A in FIG. 1, showing an alternate channel mounting configuration.
FIG. 6B is a cross sectional view taken along lines B—B in FIG. 1, showing an alternate protective panel mounting configuration.
FIG. 7A is a cross sectional view taken along lines A—A in FIG. 1, showing yet another channel mounting configuration.
FIG. 7B is a cross sectional view taken along lines B—B in FIG. 1, showing yet another protective panel mounting configuration.
FIG. 9 is a front view of a horizontally sliding door, wherein multiple cables are connected to at least one reel which is rotatably actuated to selectively open and close the sliding door.

The first channel guide members 20, shown in cross-section in FIG. 3 and FIG. 5A comprises a first wall confronting member 22, a first side extending member 24, and a first panel confronting member 26. As shown in FIG. 5A and FIG. 6A, panel apertures 72 are sized to receive a conventional fastening means 70, such as a machine screw, bolt, rivet, etc. to secure the protective panel 40 to the kennel wall 12. A screw slot 29 having a plurality of opposing ridges 31 are sized to receive a screw thread therein, to secure the protective panel 40 to the first channel guide member 20 and to the second channel guide member 30.

As shown in FIG. 6A and FIG. 6B, the first and second channel guide members 20, 30 preferably have an elongated screw slot 29 extending the length of each channel guide member 20, 30. This enables the protective panel to be easily aligned and installed upon the first and second channel guide members 20, 30, without regard for vertical tolerances. The elongated screw slot 29 has opposing ridges 31 which are sized to be closely received by a fastening means 70 of a selected size, such as a No. 10 self tapping screw. Of course, other fastening means of other sizes may also be used, and such use is intended to be included within the scope of the following claims.

As best shown in FIG. 6A, a counter-sunk hole 73 may be positioned in alignment with the screw slot 29, to receive a suitable fastening means 70 therein. As shown in FIG. 6B, the protective panel 40 is secured by a suitable fastening means 70 which extends through an aperture 74 in the protective panel 40, to engage the screw slot 29 in respective first and second channel guide members 20, 30. This eliminates the need for a mounting flange 23 shown in FIG. 5A and FIG. 5B.

FIG. 7A shows an alternative embodiment, wherein an enlarged clearance hole 73 extends through the panel confronting side 26 of respective channel guide member 20 in alignment with a mounting hole 72 fastening means 70 extending through the wall confronting side of the channel guide member 20. In this configuration, the sides 25, 27 are extended to provide clearance between the head of the fastening means 70 and the sliding door 40.

The first and second channel guide members 20, 30 are substantially vertically secured to the wall 12 with the sliding door in the open or raised position shown in FIG. 2 to provide access to fastening means 70, as shown in FIG. 7A. With the door 40 closed, as shown in FIG. 1, access to fastening means 70 is restricted by door 40.

Figure 5B:
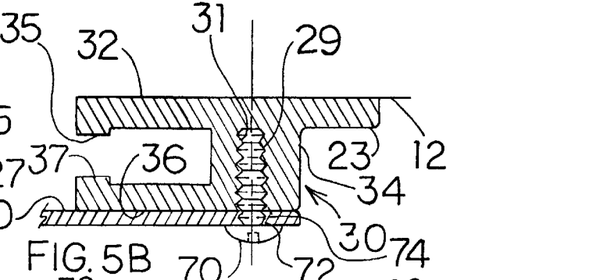
FIG. 5B is a cross sectional view taken along lines B—B in FIG. 1, showing one example protective panel mounting configuration.

While the preferred wall 12 mounting configurations are shown in FIG. 5A, FIG. 6A and FIG. 7A, and the protective panel 40 mounting configurations are shown in FIG. 5B, FIG. 6B and FIG. 7B, it is understood that the wall 12 mounting configurations and the protective panel 40 mounting configurations are common to both first and second channel guide members 20, 30.

Likewise, the second channel guide member 30, shown in cross-section in FIG. 6B, comprises a second wall confronting member 32, a second side extending member 34 and a second panel confronting member 36. Panel apertures 72 are sized to receive a conventional fastening means 70, such as a machine screw, bolt, rivet, etc. to secure the protective panel 40 to the second channel guide member 30.

Alternatively, the protective panel 40 may be secured to the first and second channel guide members 20, 30 by other conventional fastening means, such as by gluing, welding, etc., without departing from the spirit of this disclosure, or of the scope of the following claims. The first and second channel guide members 20, 30 are preferably made of metal for strength and durability. Preferably, the first and second channel guide members 20, 30 are extruded of aluminum and cut to length.

The first and second channel guide members 20, 30 are preferably secured to the kennel wall 12 in several locations, with conventional fastening means 70 which extend through a suitably sized apertures 72 located along the wall confronting side 22, 32 of respective channel guide members 20, 30. An enlarged aperture 73 in alignment with each respective aperture 72 provides access to fastening means 70 for ease of installation.

As best shown in FIG. 5A and FIG. 5B, an external mounting flange 23 may extend from the channel guide members 20, 30, for ease of mounting the kennel door apparatus 10 to the kennel wall 12. However, the kennel door apparatus disclosed herein is preferably mounted as shown in FIG. 6A and FIG. 6B, or FIG. 7A and FIG. 7B to reduce manufacturing costs, to provide a more compact installation, and to reduce the size and weight of the kennel door apparatus 10 for ease of shipping and handling.

The protective panel 40 preferably is formed with a front protective panel portion 42 and an end protective panel portion 44. The protective panel 40 is preferably made of chew resistant metal such as aluminum sheet stock of from 0.015 to 0.375 in thickness. Alternately, the protective panel 40 may be installed on opposing sides of the first and second channel guide members 20, 30 to protect the enclosed cable 68 from being chewed by animals through wire fence material 94 as shown in FIG. 13.

Where the protective panel 40 is secured to the first and second channel guide members 20, 30 with conventional fastening means, such as a screw, bolt or rivet, etc. apertures 74 may be provided in the sides of the protective panel 40 in alignment with the apertures 72 in the first and second channel guide members 20, 30 to receive and secure the fastening means there-through.

As shown in FIG. 1, a cable aperture 48 is preferably centered in the end of the protective panel portion 44, to receive and guide cable 68 there-through. A cable grommet 49 may be secured about the cable aperture 48 to better slidably receive the cable 68 there-through.

Cable 68 is preferably a twisted or woven metal cable which is sized to extend from the sliding door 50 to a remote location for ease of access to a plurality of kennel door apparatus 10. Metal cable 68 is preferred for strength and durability. Preferably the cable 68 is selected from a range of from one eighth inch to three-eighth inches in diameter. The cables 68 may optionally be coated with a plastic coating or covering, as practiced in the art, to suit user preference.

The sliding door 50 is sized to be slidably received between the respective first and second wall confronting members 22, 32, and the first and second panel confronting members 26, 36. Clearance is preferably provided for changing temperature and expansion and contraction of materials within anticipated temperature extremes.

Preferably, the first and second wall confronting members 22, 32 and the first and second panel confronting members 26, 36 each have sliding door confronting lips 25, 27 and 35, 37 to reduce the friction against the sliding door 50 as it is moved between open and closed positions. The respective sliding door confronting lips 25, 27 and 35, 37 also serve to provide clearance for the fastening means 70, as best shown in FIG. 7A.

The sliding door 50 is made of metal or plastic sheet materials, having a thickness selected from a range of 0.018 to 0.380 inches.

A transparent or translucent plastic sheet stock may also be used, for visibility between the common kennel run area and the individual kennel pens 19, and to improve lighting within the kennel pens 19. The sliding door 50 has a first door side 51 and a second door side 52 which are sized to slide between opposing first and second vertically positioned side members 24, 34.

The first end 56 of the sliding door 50 preferably extends flush or below the bottom 15 of kennel opening 14, while the second end 54 of the sliding door 50 remains beneath the protective panel 40. When the sliding door 50 is biased into an open position, the first end 56 of the sliding door 50 extends beneath the protective panel 40 to restrict damage from animals attempting to chew on the sliding door 50.

A cable 68 is secured to the second end 54 of the sliding door 50, which is also protected from damage from animals chewing on the cable 60, as the cable 68 remains beneath the protective panel 40 when the sliding door 50 is lowered into a closed position.

Preferably, a weather strip 58 is secured along end 54 of the sliding door 50 between the first and second channel guide members 20, 30 to reduce drafts between the sliding door 50 and the protective panel 40. The weather strip 58 may be made from metal, plastic, foam, felt, fabric, or other known material to suit manufacturing preference.

A door guard opening attachment 82 may be used to extend the opening, as shown in FIG. 10. The door opening attachment 82 is useful where the opening is rough or thick, such as when extending through a block wall, or a wire fence 94, etc.

The opening attachment 82 in a specific embodiment has a front fascia flange 95 for connecting the first and second channel guide members 20, 30 to the front of the attachment 82 instead of directly to the wire fence 94. The front fascia 95 has holes corresponding to the clearance holes 73 and mounting holes 72 of the respective channel guide members 20, 30 for mounting. The opening attachment 82 may have any length suitable for extending through the thickness of opening 14 in the kennel wall 12, and is configured to form the bottom aperture portion 15, opposing side aperture portions 16, 17, and top aperture portion 18 of the opening 14.

One or more pulleys 62 may be used to route the cable 68 to a remote area for ease of manipulation of the sliding door 50 between open and closed positions. A one or more remote lever(s) 64 may be pivotally secured 66 to a remote kennel wall 12 or control panel (not shown), to selectively extend and retract the cable 68. The sliding door is installed for vertical actuation, therefore, the weight of the sliding door 50 serves to pull the cable into the closed position when the lever 64 is moved to the closed position, and the lever 64 is preferably manually biased into an open position to raise the sliding panel 50.

In this way, the operator may selectively actuate one or more kennel door apparatus 10 from a remote location. A bar 67 may be releasably secured to extend through more than one lever 64, for ease of simultaneous manual actuation of more than one lever 64. Where individual lever 64 control is preferred, bar 67 may be removed to provide individual lever 64 control. Handle 65 makes actuation of bar 67 easier to operate. This is especially useful in emergency situations where it is desirable to open more than one kennel door 50 simultaneously. See FIG. 4.

The kennel door apparatus 10 disclosed herein is easy to clean with water hose and/or disinfectant, and will not absorb odors. The component parts of the kennel door apparatus are chew resistant, and easy to install. The kennel door apparatus 10 is preferably packaged in a kit, with all necessary hardware and instructions included, for ease of assembly on site.

The kennel door apparatus 10 preferably comes in two exemplary sizes: a twelve inch wide by 22 inch tall size for smaller animals; and a fifteen inch wide by 29 inch tall size for larger animals. However, it is within the scope of one of average skill in this art to make other sizes to fit a variety of animals and/or kennel wall opening sizes and thicknesses, and such alternate opening sizes and opening thicknesses are intended to fall within the scope of the following claims.

In operation, the cable 68 maybe selectively biased to move the sliding door between open and closed positions. Where multiple kennel door apparatus 10 are employed, such as to provide access from individual kennel pens 19 to a common kennel run area 92, the various cables 68 may be routed to a remote location 98, and manually, mechanically or electronically actuated between open and closed positions.

Figure 11:
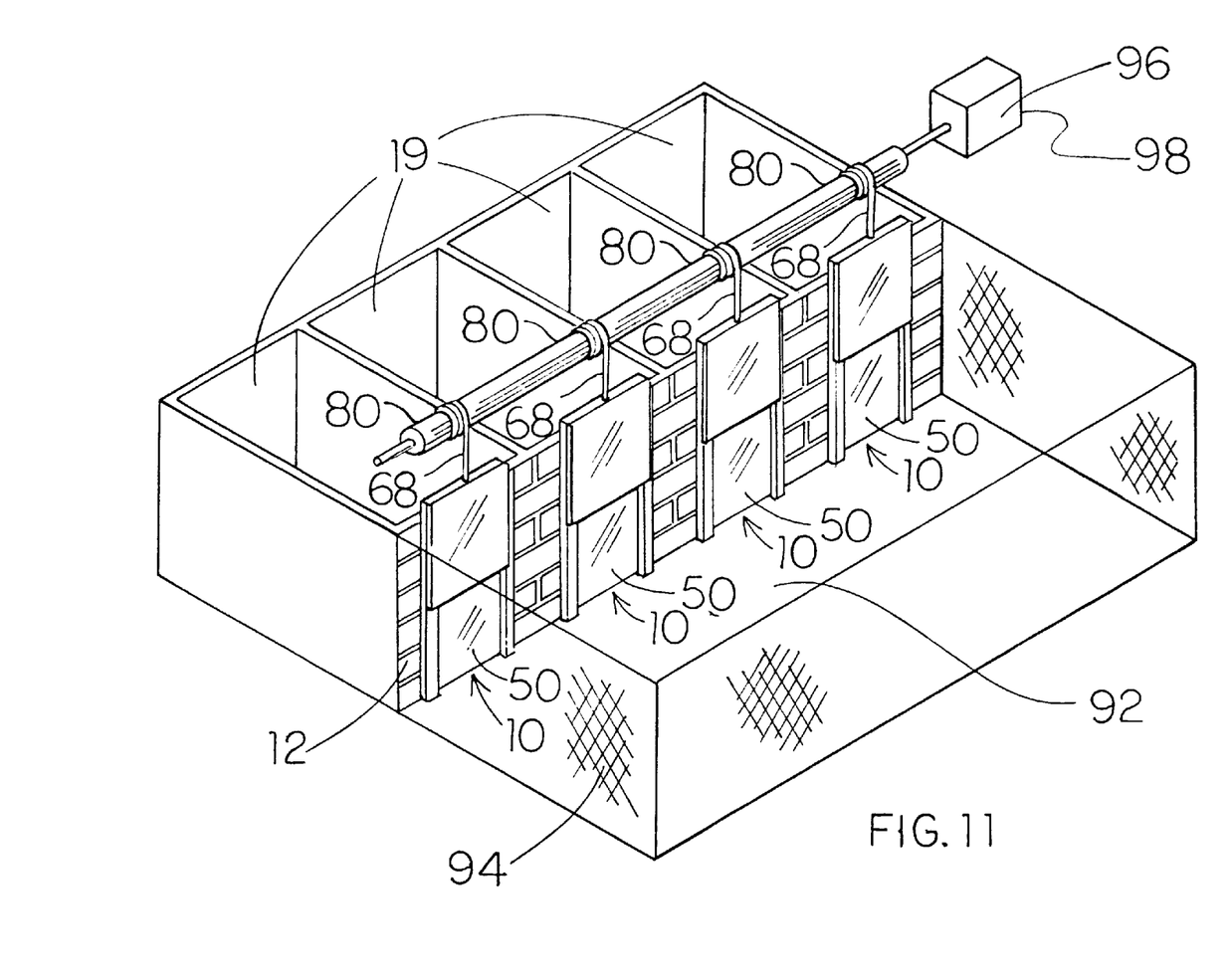
FIG. 11 is a perspective view of a complete kennel having several kennel door apparatuses attached to the kennel wall at the kennel wall openings leading to each of several individual kennel pens, the openings leading to a common kennel run area, the sliding door of each apparatus being actuated by a reel system controlled from a remote location by a motor.
Figure 12:
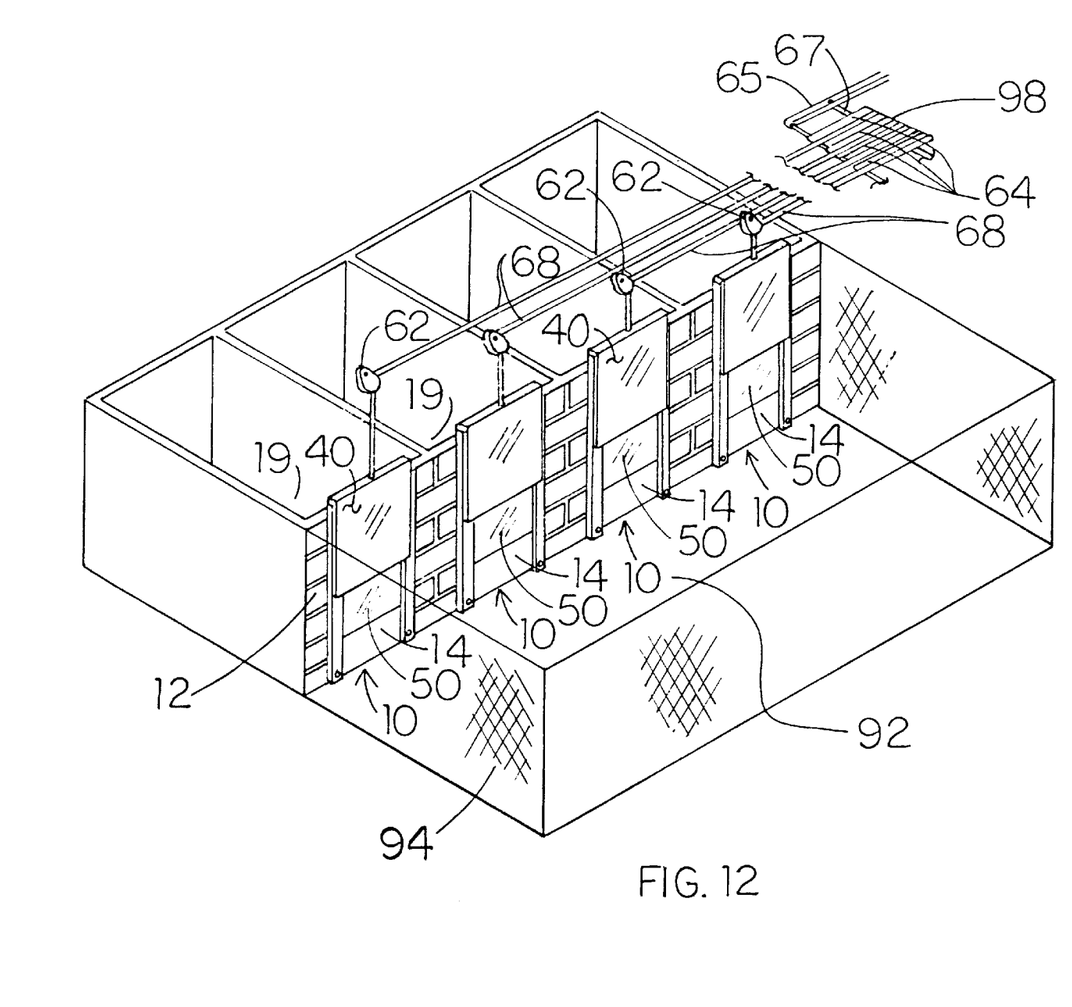
FIG. 12 is a perspective view of a complete kennel such as in FIG. 11, but for which the sliding door of each apparatus is actuated by a pulley and lever system manually controlled from a remote location.

FIGS. 11 and 12 show a kennel employing multiple kennel door apparatuses 10 to provide access from individual pens 19 to a common kennel run area 92, such apparatuses 10 being controlled at a remote location 98.

Preferably, as shown in FIG. 4, the sliding door is vertically mounted, and each lever 64 extends over-center in the open position to resist cable tension and the weight of the sliding door 50 from inadvertently moving the cable to a closed position. A bar 67 may be employed to pivotally bias more than one lever 64 to move a plurality of sliding doors between open and closed positions. By way of an example, a six inch lever 64 will draw twelve inches of cable 68 when the lever 64 is pivoted about 180 degrees. Likewise, a nine inch lever 64 will draw eighteen inches of cable 68 when the lever 64 is pivoted about 180 degrees.

Figure 8:
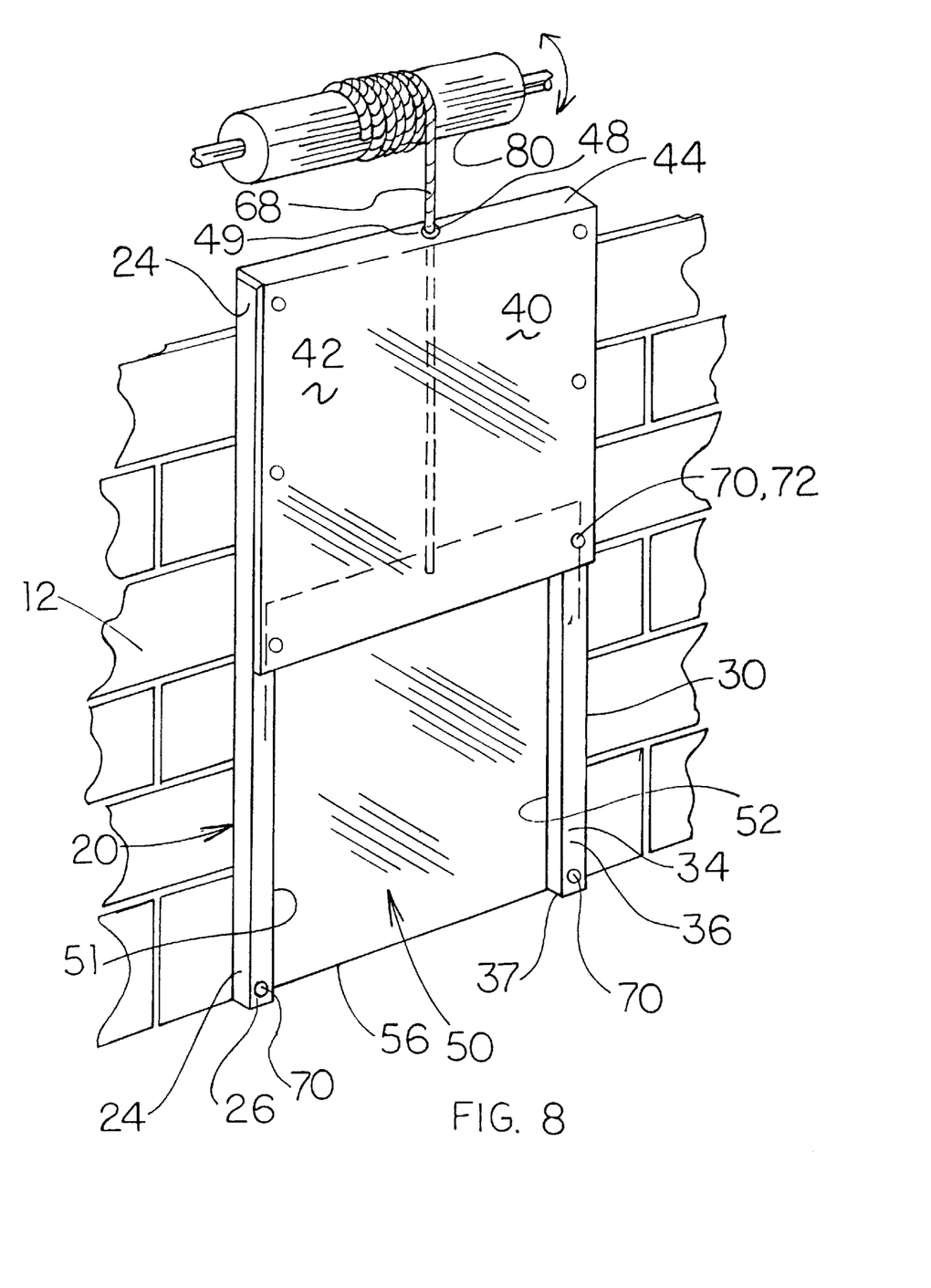
FIG. 8 is a front view of a vertically sliding door, wherein a reel is rotatably actuated to selectively open and close the sliding door.

Of course, one of average skill in this art could adapt this kennel door apparatus 10 to be controlled by electric or hydraulic or pneumatic actuation, and such adaptations are intended to fall within the scope of the following claims. By way of example, FIG. 8 shows the cable 68 being wound upon a reel 80 which may be selectively actuated by a suitable motor 96 or cylinder mechanism (not shown) which are well known in the art for biasing a cable 68 between extended and retracted positions. Such a motor 96 may be actuated from a remote location. FIG. 11 shows the cable 68 for each apparatus 10 being wound upon a series of reels 80 which maybe simultaneously actuated by a motor 96 at a remote location 98 to permit multiple animals (not shown) access from individual pens 19 to a common kennel run area 92.

Alternatively, as shown in FIG. 9, the sliding door 50 may be horizontally actuated by winding one of the cables 68, 69 on a reel 80 in a clockwise rotation, while the other cable 68, 69 is wound on a similar reel 80 in a counter clockwise rotation. The same reel 80 may be used, where the cable 68 is wound in one rotational direction, and the cable 69 is wound in the opposite rotational direction, so that rotation of reel 80 simultaneously extends one cable 68, 69 while retracting an equal amount of the other cable 68, 69. As a result, cable 68 may be used to pull the sliding door 50 into an open position, and oppositely positioned cable 69 may be used to pull the sliding door 50 into a closed position, as best shown in FIG. 9.

As shown in FIGS. 8 and 11, one or more reels 80 maybe adapted to rotate in one direction to open the sliding door 5, and to rotate in an opposite direction to close the sliding door 50. The reel 80 may be adapted for manual, electric or hydraulic actuation, to suit user preference.

Although the present invention has been illustrated and described in connection with certain example embodiments, it will be understood that these embodiments are selective and are exemplary of the preferred embodiments of this invention, and it is intended that such revisions and adaptations will be construed as being within the limits of the scope of the accompanying claims.

What is claimed is:

1. A kennel door apparatus surrounding a selected opening in a kennel wall from a kennel pen to a common kennel run area, comprising:
    a) at least one kennel wall having multiple kennel openings sized for animal egress and ingress from individual kennel cells to a common kennel run area;
    b) individual sliding kennel door apparatus mounted about each of the multiple kennel openings, each individual kennel door apparatus comprising first and second vertically positioned channel guides and a protective panel extending between said first and second channel guides;
    c) a sliding door slidably received between each of said first and second channel guides and between at least a portion of said protective panel and said kennel wall;
    d) a cable secured to each said multiple sliding doors and positioned between the kennel wall and said protective panel, said cable extending over cable guides at each change of direction to a remote location for remote actuation of multiple sliding doors;
    e) at least one remotely positioned cable reel to receive said multiple cables, said remotely positioned cable reel rotated to selectively or simultaneously raise and lower said multiple sliding doors to provide egress and ingress between the multiple kennel pens and a common kennel run area,
    wherein the protective panels protect the cable from being chewed upon by the animals located in the common kennel run area while the kennel wall protects the cables from being chewed upon by the animals located in the kennel pens.

2. The kennel door apparatus of claim 1, wherein each of the openings in the kennel wall is sized to receive a selected size of animal there-through, and each of the sliding doors is sized to conform to the size of each of the openings in the kennel wall.

3. The kennel door apparatus of claim 1, wherein the cable guides are pulleys which are rotatably secured to the kennel wall at a location out of reach of the animals in the common kennel run area.

4. The kennel door apparatus of claim 1, wherein the Cable reel is electrically actuated.

5. A kennel door apparatus for selective animal egress and ingress from individual kennel pens through an opening in a kennel wall, comprising:
    a) Multiple kennel openings sized for animal egress and ingress from individual kennel pens to a common kennel run area;
    b) individual kennel door apparatus mounted about each of the kennel openings, each individual kennel door apparatus comprising first and second vertically aligned channel guides secured on opposing sides of said kennel opening, and a protective panel secured between said first and second channel guides, said protective panel having a protective cover extending above said kennel opening with a top portion covering the upper end of the first and second channel guides;
    c) a sliding door slidably received between each of said first and second channel guides and between at least a portion of said protective panel and said kennel wall;
    d) at least one cable secured to each said sliding door and protected from animal chewing by said protective panel and said kennel wall, said cable extending over pulleys to a remote location for remote actuation;
    e) at least one remotely positioned cable reel to receive said cables, said remotely positioned cable reel rotated to selectively or simultaneously raise and lower said sliding doors.

6. The kennel door apparatus of claim 5, wherein each of the protective panels is secured to respective first and second channel guides to pre-align said kennel door apparatus for ease of installation and alignment about a selected opening in said kennel wall.

7. The kennel door apparatus of claim 5, wherein at least one kennel door apparatus has a door guard opening attachment secured to said channel guides, said door guard opening attachment having an animal opening sized to pass an animal there-through, the door guard opening attachment extending through the opening in the kennel wall to protect the animal passing through the opening in the kennel wall from direct contact with the kennel wall.

8. The kennel door apparatus of claim 5, wherein said kennel wall is a wire fence, and first and second protective panels are secured on opposing sides of the first and second channel guide members to protect the cable from being chewed upon by animals on either side of the wire fence.

9. The kennel door apparatus of claim 5, wherein said cables may be remotely manually actuated in the event of an emergency, where power is not available, and it is essential to quickly release multiple animals from multiple kennel pens.

10. The kennel door apparatus of claim 5, wherein the plurality of cables are each twisted metal cables of a size selected from a range of one-eighth inch diameter through three-eighth inch diameter.

11. The kennel door apparatus of claim 5, wherein said sliding kennel door is substantially made of a light transmissive material for improved visibility within said kennel walls.

12. The kennel door apparatus of claim 5, wherein a weather strip is secured to the upper side of each of the sliding doors, for improved weather resistance.

13. The kennel door apparatus of claim 12, wherein said kennel wall is a wire fence, and opposing protective panels are secured on opposing sides of the first and second channel guide members to protect the cable from being chewed upon by animals on either side of the wire fence.

14. Multiple kennel door apparatus, comprising:
  a) at least one kennel wall having multiple kennel openings sized for animal egress and ingress from individual kennel cells to a common kennel run area;
  b) a door guard opening attachment having an animal opening sized to pass an animal there-through, said door guard opening attachment extending through each of the openings in the kennel wall to protect animals from direct contact with the opening in the kennel wall;
  c) first and second vertically aligned channel guides secured to the door guard opening attachment on opposing sides of each said animal opening;
  d) a protective panel secured to the first and second channel guides substantially above the door guard opening attachment;
  e) a kennel door slidably received between said first and second channel guides, and between at least a portion of said protective panel and said kennel wall;
  f) a cable secured to each said sliding door and extending to a remote location for remote actuation of said sliding door;
  g) at least one remotely positioned cable reel to receive said cable, said remotely positioned cable reel rotated to selectively or simultaneously raise and lower said multiple sliding doors.

15. The multiple kennel door apparatus of claim 14, wherein said kennel wall is a wire fence, and opposing protective panels are secured on opposing sides of the first and second vertically aligned channel guide members to protect the cable from being chewed from either side of the multiple kennel door apparatuses.

16. The multiple kennel door apparatus of claim 14, wherein said cables may be remotely manually actuated in the event of an emergency, where power is not available, and it is essential to quickly release multiple animals in multiple kennel enclosures.

17. The multiple kennel door apparatus of claim 14, wherein the plurality of cables are each twisted metal cables of a size selected from a range of one-eighth inch diameter through three-eighth inch diameter.

18. The multiple kennel door apparatus of claim 14, wherein the kennel doors are substantially made of a light transmissive material for improved visibility within said kennel walls.

19. The multiple kennel door apparatus of claim 14, wherein a weather strip is secured to the upper side of each of the sliding doors, for improved weather resistance.

20. The kennel door apparatus of claim 14, wherein each of the protective panels is secured to respective first and second channel guides to pre-align said kennel door apparatus for ease of installation and alignment prior to installation about a selected opening in said kennel wall.

* * * * *